(12) United States Patent
Owens

(10) Patent No.: US 9,083,790 B1
(45) Date of Patent: Jul. 14, 2015

(54) OBTAINING AND PRESENTING OF A PLURALITY OF IMAGES FROM A PLURALITY OF IMAGE SOURCES IN RESPONSE TO TELEPHONE DEVICE COMMUNICATION

(71) Applicant: Sprint Spectrum L.P., Overland Park, KS (US)

(72) Inventor: David Owens, Lawrence, KS (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

(21) Appl. No.: 14/226,200

(22) Filed: Mar. 26, 2014

(51) Int. Cl.
*H04M 11/00* (2006.01)
*H04M 3/42* (2006.01)
*H04W 4/14* (2009.01)

(52) U.S. Cl.
CPC ............ *H04M 3/42093* (2013.01); *H04W 4/14* (2013.01)

(58) Field of Classification Search
CPC .......... H04M 1/576; H04M 1/274508; H04M 1/274516; H04M 1/575; H04M 1/72552; G06F 17/30864; G06Q 30/0269; H04W 4/12; H04W 4/14
USPC .......... 379/93.23, 93.17, 90.01; 455/466, 415
See application file for complete search history.

(56) References Cited

U.S. PATENT DOCUMENTS

| 7,062,029 | B2 | 6/2006 | Lund |
| 7,839,429 | B2 | 11/2010 | Williams et al. |
| RE43,893 | E | 1/2013 | Lee et al. |
| 8,345,835 | B1* | 1/2013 | Or-Bach et al. ............ 379/88.23 |
| 8,396,514 | B2* | 3/2013 | Adams ........................... 455/566 |
| 8,626,211 | B2* | 1/2014 | Yun et al. ...................... 455/466 |
| 2008/0088700 | A1 | 4/2008 | Mornhineway et al. |
| 2010/0015976 | A1 | 1/2010 | Issa et al. |
| 2011/0274260 | A1* | 11/2011 | Vaananen .................. 379/93.23 |
| 2012/0150870 | A1 | 6/2012 | Liao et al. |
| 2012/0196581 | A1 | 8/2012 | Papakipos et al. |
| 2013/0051542 | A1 | 2/2013 | Yao et al. |

* cited by examiner

*Primary Examiner* — Stella Woo

(57) ABSTRACT

When a user operates a telephone device to engage in a communication with another user, the user's telephone device responsively obtains from a from a plurality of image-sources a plurality of images associated with the other user and presents the obtained images on a user interface. The telephone device may obtain one or more of the images from a social network account of the other user, and the telephone device may obtain one or more of the images from an image library stored by the telephone device. Further, the telephone device may stitch together the obtained images as a collage, slide show, or the like, and present the stitched-together images during setup of the communication and/or or during the communication itself.

16 Claims, 6 Drawing Sheets

OBTAINING AND PRESENTING OF A PLURALITY OF IMAGES FROM A PLURALITY OF IMAGE SOURCES IN RESPONSE TO TELEPHONE DEVICE COMMUNICATION

BACKGROUND

Unless otherwise indicated herein, the information described in this section is not prior art to the claims and is not admitted to be prior art by inclusion in this section.

In general, a telephone device may enable a user to engage in communications of various types with others. By way of example, a telephone device may support traditional voice calls, advanced voice over Internet Protocol (VoIP) calls, text messaging, and e-mailing, among other forms of communication. Further, modern telephone devices, such as smart phones for instance, may function essentially as portable computers, enabling users to access Internet content and benefit from a seemingly limitless range of application programs and functions.

OVERVIEW

When a user operates a telephone device to engage in a communication with another party, the result is generally just an exchange of communications between the user and the other party. For instance, in a telephone call, the user and the other party merely exchange voice communications with each other. Whereas, with text messaging, the user and the other party merely exchange text messages with each other.

As a separate matter, online social network technology has gained widespread popularity over the years. In general, social network technology enables users to establish social network accounts and social network connections with others, providing a platform for users to conveniently post comments and other content and to view posted comments and content from their connected friends, family, colleagues, and others.

Moreover, a telephone device may maintain an image library that stored numerous images, which may be tagged with metadata indicating subject matter of the images. For instance, images in the library may be tagged with metadata that indicates the identities of people in the images and/or other subject matter of the images.

In accordance with the present disclosure, when a user operates a telephone device to engage in a communication with another user, the user's telephone device will responsively obtain from a from a plurality of image-sources a plurality of images associated with the other user and will present the obtained images on a user interface. The telephone device may obtain one or more of the images from a social network account of the other user, and the telephone device may further obtain one or more of the images from an image library stored by the telephone device. Additionally, the telephone device may stitch together the obtained images as a collage, slide show, or the like, and may present the stitched together images during setup of the communication and/or or during the communication itself.

Advantageously, this process can enhance telephone device communication by allowing the user of the telephone device, when engaging in a communication with the other party, to enjoy images that the other party has posted on their social network account or images that are otherwise accessible through the other party's social network account, along images from the local image library that are associated with the other party. Thus, if the other party has recently posted on their social network account one or more images depicting life events or other scenarios, or if friends of the other party have recently posted or shared such images on the other party's social network account, and if the user has also captured or otherwise stored images of the other party in the image library of the telephone device, this process may enable the user of the telephone device to conveniently see those images when the user places a telephone call to the other party or receives a telephone call from the other party, or when the user engages in a text message exchange with the other party.

In practice, the user's telephone device may present on a display screen the images that the telephone device obtains from the other party's social network account and from the local image library, perhaps formatting the presentation in a slide show or collage arrangement, or with the images otherwise stitched together, for the user's enjoyment. If the communication is a telephone call, the telephone device might provide this presentation in a manner that fills the entire display screen or in a manner that fills just a portion of the display screen. Whereas, if the communication is a text message exchange, the telephone device may present a split screen, with part of the screen showing the text message exchange and another part of the screen showing the images. Other arrangements are possible as well.

Accordingly, in one respect, disclosed is a method that would be carried out by a first telephone device operated by a first user. In accordance with the method, the first telephone device engages in a communication with a second telephone device operated by a second user. Further, responsive to engaging in the communication (e.g., responsive to setup of the communication or connection of the communication), the first telephone device may obtain from a plurality of image-sources a plurality of images associated with the second user and may present the obtained images on a user interface, optimally stitched together in a collage, a slide show, or other format.

In this method, the act of the first telephone device obtaining from the plurality of image-sources the plurality of images associated with the second user may involve (a) the first telephone device obtaining, as one or more of the plurality of images, one or more images from a social network account of the second user and (b) the first device obtaining, as another one or more of the plurality of images, one or more other images from an image library stored by the first telephone device.

Further, the act of the first telephone device obtaining the one or more images from the social network account of the second user may involve (i) the first telephone device accessing a social network account of the first user, (ii) the first telephone device using a social network connection between the accessed social network account of the first user and the social network account of the second user, to obtain through the accessed social network account of the first user the one or more images from the social network account of the second user. And the act of the first telephone device obtaining the one or more other images from the image library stored on the first telephone device may involve (i) the first telephone device searching through the image library to identify at least one image based on the at least one image being tagged with metadata associated with the second user and (ii) the first telephone device obtaining from the image library the at least one identified image.

In another respect, disclosed is a method that may also be carried out by a first telephone device operated by a first user. In accordance with the method, the first telephone device establishes a communication between the first telephone device and the second telephone device operated by the second user (e.g., places/sends or receives the communication or participates in the communication). Further, responsive to the establishing of the communication, the first telephone device carries out a plurality of functions including: (a) determining an identifier of the second user based on identification information sent or received during setup of the communication, (b) using an application program on the first telephone device to access an online social network account of the first user, (d) using the determined identifier of the second user as a basis to access, through the accessed online social network account of the first user, an online social network account of the second user, (e) obtaining from the accessed online social network account of the second user at least one image, and (f) presenting the obtained at least one image on a user interface, in a collage or slide show for instance, during at least part of the communication.

And in yet another respect, disclosed is a telephone device that includes a network interface, a user interface, a processing unit, data storage, and program instructions stored in the data storage and executable by the processing unit to carry out functions such as those described above. In particular, the program instructions may include first program instructions to access via the network interface an online social network service, such as program instructions that define a browser or social network application program operable to access the social network service. And the program instructions may further include second program instructions to detect a communication via the network interface between the telephone device and a remote device, and to respond to the detecting of the communication by carrying out functions comprising (i) using the first program instructions to access an account that a user of the telephone device has with the online social network service, (ii) through the accessed account of the user of the telephone device, accessing an account that a user of the remote device has with the online social network service, (iii) obtaining at least one image from the accessed account that the user of the remote device has with the online social network service, (iv) obtaining from an image library stored in the telephone device at least one image associated with the user of the remote device, and (v) providing for presentation on the user interface a plurality of images including both the at least one image obtained from accessed social network account of the user of the remote device and the at least one image obtained from the image library stored in the telephone device.

These as well as other aspects, advantages, and alternatives will become readily apparent to those of ordinary skill in the art by reading the following detailed description with reference where appropriate to the accompanying drawings. Further, it should be understood that the description provided below and in this overview is intended to explain the invention by way of example only and not by way of limitation.

DETAILED DESCRIPTION

Figure 1:
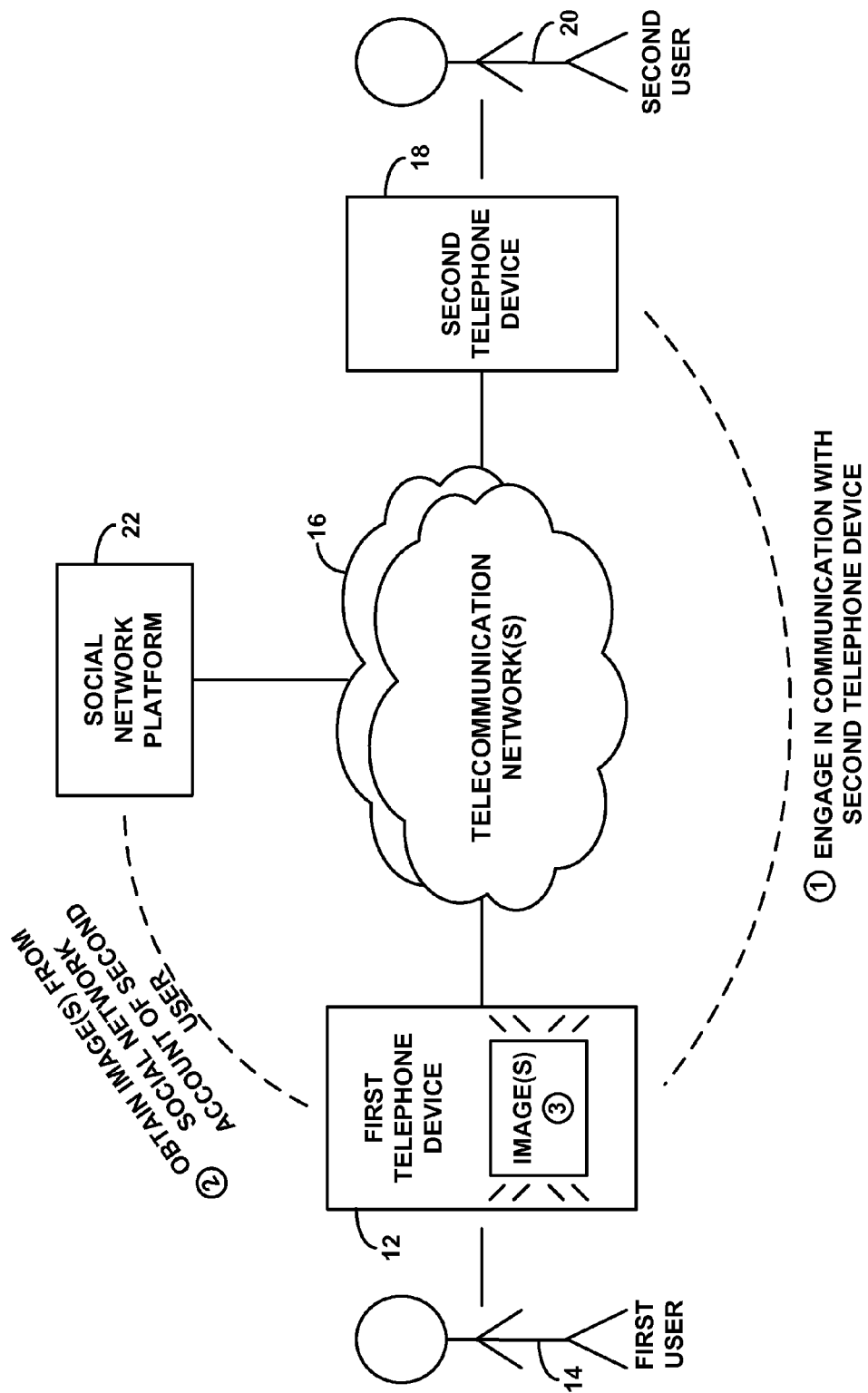
FIG. 1 is a simplified block diagram generally depicting a representative arrangement in which embodiments of the present method can be implemented.

Referring to the drawings, as noted above, FIG. 1 is a simplified block diagram generally depicting a representative arrangement in which an example of the present method can be implemented. As shown in FIG. 1, a first telephone device 12 operated by a first user 14 has or obtains connectivity with one or more telecommunications networks 16 arranged to provide connectivity in turn with a second telephone device 18 operated by a second user 20 and further with a social network platform 22.

As shown in this figure, as a first step, the first telephone device 12 engages in (e.g., establishes or participates in) a communication with the second telephone device 18 via the telecommunication network(s) 16. And as a second step, in response to engaging in the communication, the first telephone device 12 obtains from a social network account of the second user 20 one or more images. In turn, as a third step, the first telephone device 12 then presents the one or more images on a user interface (shown here as part of the first telephone device by example), during at least part of the communication for instance.

In an example implementation of this process, when the first telephone device 12 engages in the communication with the second telephone device 18, the first telephone device 12 may make use of a telephone number or other address information associated with the second telephone device 18 as a basis to determine an identifier, such as a name, of the second user 20 for use to facilitate accessing the second user's social network account.

The first telephone device 12 may ascertain the telephone number or other address information associated with the second telephone device 18 during or otherwise in conjunction with setup of the communication. For instance, if the communication is an outbound communication placed/sent by the first telephone device 12 to a telephone number or other address of the second telephone device 18, the first telephone device 12 may note that telephone number or other address used by the first telephone device 12 to place/send the communication. Or if the communication is an inbound communication received by the first telephone device 12 from the second telephone device 18, the first telephone device 12 may receive the telephone number or other address of the second telephone device 18 in communication setup signaling or in the received communication and may note the telephone number or other address.

The first telephone device 12 may then map the ascertained telephone number or other address of the second telephone device 18 to an identifier of the second user 20, by referencing directory information stored on the first telephone device 12. For instance, the first telephone device 12 may be provisioned with a personal address book or other directory that is populated with contact entries established by the first user 14, and the first telephone device 12 may query that directory to access a contact entry that lists the ascertained telephone number or other address of the second telephone device 18. The first telephone device 12 may then read a "name" field or the like in that contact entry, to determine as the identifier a name, which may be the name of the second user 20 as the user of the second telephone device 18. Alternatively, if the contact entry has another field that specifies a social network username of the second user 20, the first telephone device 12 may read that username in particular as the identifier.

Provided with the identifier of the second user 20, the first telephone device 12 may then access a social network account of the second user 20 by making use of a social network connection between a social network account of the first user 14 and the social network account of the second user 20. To facilitate this, the first telephone device 12 may first access the social network account of the first user 14 and then, using the social network connection between the social network account of the first user 14 and the social network account of the second user 20, may access the social network account of the second user 20 through the accessed social network account of the first user 14.

To access the social network account of the first user 14, the first telephone device 12 may conveniently make use of a social network application or browser application on the telephone device 12 that is arranged to access the social network account of the first user 14. In practice, for instance, the first telephone device 12 may have installed a social network application that is configured specifically for accessing the social network platform 22. By way of example, if the social network platform 22 is Facebook, the social network application may be a Facebook application, which, when run, provides access to Facebook. Further, the social network application may be configured, by previous username/password input from the first user 14 for instance, to specifically access the social network account of the first user 14 on the social network platform 22. Thus, upon calling or otherwise invoking the social network application, the first telephone device 12 may access the social network account (e.g., social network page) of the first user 14.

The social network application used in this process may be an application that is normally accessible and usable by the first user 14 to gain access to the social network platform 22. However, for purposes of the present method, the first telephone device 12 may advantageously make use of the social network application in the background, without revealing to the first user 14 that the first telephone device 12 is making use of the social network application. To do this, the first telephone device 12 may call an instance of the social network application but not give the called instance focus and/or may keep a "visible" property of the instance turned off. Alternatively, the social network application may be one that is not normally accessible and usable by the first user 14 but that is defined perhaps specifically for this background use, in which case the first telephone device 12 would likewise not reveal its use of the social network application. (Still alternatively, it is possible that the first telephone device 12 could reveal its use of the social network application, but revealing that use might be less desirable from a user experience perspective.)

Optimally, the social network application may be configured to interact with the social network platform so as to obtain certain defined pieces of information regarding the social network account that the social network application is currently accessing. This interaction may be pursuant to any defined communication protocol, with the social network application and social network platform being arranged to communicate with each other according to the protocol.

Some of the information that the social network application receives from the social network platform 22 in this process may be by default, such as a general newsfeed listing recent posts on the social network account being accessed, and certain images associated at a high level with that social network account (e.g., profile or header images). And other information that the social network application receives from the social network platform 22 in this process may be by particular request, such as with the social network application sending to the social network platform certain queries and query parameters and the social network platform 22 responsively transmitting particular requested information to the social network application. An example of such a query may be a query for images recently posted on the social network account being accessed.

Further, the social network application may be configured to make use of connections that the social network platform 22 defines between social network accounts, so that when the social network application is accessing one user's social network account, the social network application may then navigate through that account to access a connected social network account of another user. By way of example, the social network platform 22 may define respectively for each account a list of connected users, each specified by an identifier such as a username. When the social network application is accessing a user's social network account having such a list, the social network application may then send to the social network platform 22 a request to access the social network account of a user in the list, and the social network platform 22 may provide the requested access, to the extent the listed user has agreed to grant access, for instance. The social network application may then interact with the social network platform 22 so as to obtain information from that social network account as discussed above.

Thus, once the first telephone device 12 has accessed the social network account of the first user 14, the first telephone device 12 may then interact with the social network platform to access, through the first user's social network account, the social network account of the second user 20. In practice, for instance, the identifier of the second user 20 as discussed above may be or correspond with an identifier of the second user's social network account listed as a social network connection in the first user's social network account, and the first telephone device 12 may thus request the social network platform 22 to provide access to that connected social network account of the second user 20.

Provided with access to the social network account of the second user 20, the first telephone device 12, again making use of the social network application for instance, may then obtain from the social network account of the second user 20 one or more images for presentation by the first telephone device 12 to the first user 14. The images that the first telephone device 12 thereby obtains from the social network account of the second user 20 may be still and/or moving images that were most recently posted and/or shared on the second user's social network account and/or other images such as profile or header images from the second user's social network account. Further, as an enhancement to this process, the first telephone device 12 may limit the images that it obtains to images that are tagged, captioned, or otherwise expressly associated with the second user's name and/or with the first user's name, and/or that meet one or more other criteria, by providing to the social network platform 22 requests for such images specifically.

Once the first telephone device 12 thereby obtains the one or more images from the social network account of the second user 20, the first telephone device 12 may then present the obtained one or more images on a user interface for viewing by the first user 14. Further, the first telephone device 12 may also obtain one or more other images associated with the second user 20 from one or more other sources, such as from local data storage of the first telephone device 12 (e.g., by searching for such images that have metadata specifying or otherwise associated with the second user 20, and/or by obtaining such an image from a locally stored contact record associated with the second user 20), and may present the one or more other images in conjunction with its presentation of the one or more images obtained from the social network account of the second user 20.

The first telephone device 12 may present the one or more images (including one or more from the social network account of the second user 20 and perhaps one or more others obtained from a local image library or other source) in any of a variety of formats on a user interface of the first telephone device 12 and/or on an external user interface (such as a television or display monitor with which the first telephone device 12 has a local connection for instance). By way of example, the first telephone device 12 may graphically combine one or more such images together to generate a collage of the images, such as a presentation of the images in a grid or in a more artistic form perhaps with some overlap and angles between images, and the first telephone device 12 may then present that collage on the user interface. And as another example, the first telephone device 12 may generate and present a slide show of the images, presenting the images one at a time in sequence, with fading or other transition from one image to the next. Other examples are possible as well.

Optimally, at least a portion of this presentation of the one or more obtained images would occur during at least part of the communication between the first telephone device 12 and the second telephone device 18.

By way of example, if the communication between the first telephone device 12 and the second telephone device 18 is a telephone call, the first telephone device 12 may respond to placing/receiving and/or connection of the telephone call by engaging in the above discussed process of obtaining the one or more images, and the first telephone device 12 may present the one or more images on a user interface so that the presentation is in place at least part of the time that the call is underway between the users, even if the presentation begins before the call is underway and even if the presentation ends before the call ends.

In the event the first user 14 holds the first telephone device 12 to the first user's head during the communication, this process may work best with the user interface being external to the first telephone device 12, so the first user 14 can see the one or more images while engaged in the communication. Alternatively, if the first user 14 engages in the communication holding a telephone handset that is separate from a display screen of the first telephone device 12, or using a speakerphone function, then the process may work well with the user interface being integral/internal to the first telephone device 12, as the first user 14 may then be able to see the one or more images on the first telephone device display screen while engaged in the call.

As another example, if the communication between the first telephone device 12 and the second telephone device 18 is a text message exchange (e.g., a Short Message Service (SMS) message exchange), with presentation of one or more incoming and/or outgoing text messages on a display screen of the first telephone device 12, the first telephone device 12 may respond to sending or receipt of one or more such text messages by engaging in the above discussed process of obtaining the one or more images, and the first telephone device 12 may present the one or more images in a split screen arrangement in conjunction with presentation of the one or more text messages. For instance, the first telephone device 12 may split the display screen into at least two portions, one showing the text message exchange, and another showing the image presentation. Further, another portion, or one that the first telephone device 12 automatically interchanges with the image portion, could present an on-screen keyboard usable by the first user 14 to type text message content.

In this text message exchange example, the presentation on the display screen of one or more sent or received text messages may be considered to represent the existence of the text message exchange. Thus, the first telephone device 12 may present the one or more obtained images during at least part of the text message exchange by presenting the one or more obtained images concurrently with presentation of one or more of the sent or received text messages.

Advantageously, through this process, as the first user 14 uses the first telephone device 12 to engage in a communication with the second user 20 at the second telephone device 18, the first user 14 may enjoy viewing on the user interface of the first telephone device 12 (or on an external user interface) one or more images that the first telephone device 12 automatically obtains from the social network account of the second user 20, thereby enhancing the telephone device communication process. Further, by the first telephone device 12 obtaining and presenting the one or more images from the social network account of the second user 20 at the time the first telephone device 12 engages in (e.g., establishes) the communication with the second telephone device 18, the one or more images thereby presented in connection with that communication could be one or more images that were quite recently posted/shared on the social network account of the second user 20 (e.g., the most recently such posted/shared images), which could further enhance the first user's experience.

Note also that, as suggested above, the first telephone device 12 may also retrieve and present one or more images from local data storage in response to the first telephone device 12 engaging in the communication with the second telephone device 18. Such additional images, however, would have been stored earlier in the first telephone device 12, rather than being obtained by the first telephone device 12 in real-time from the social network account of the second user 20 in response to the first telephone device engaging in a communication with the second telephone device 18.

Figure 2:
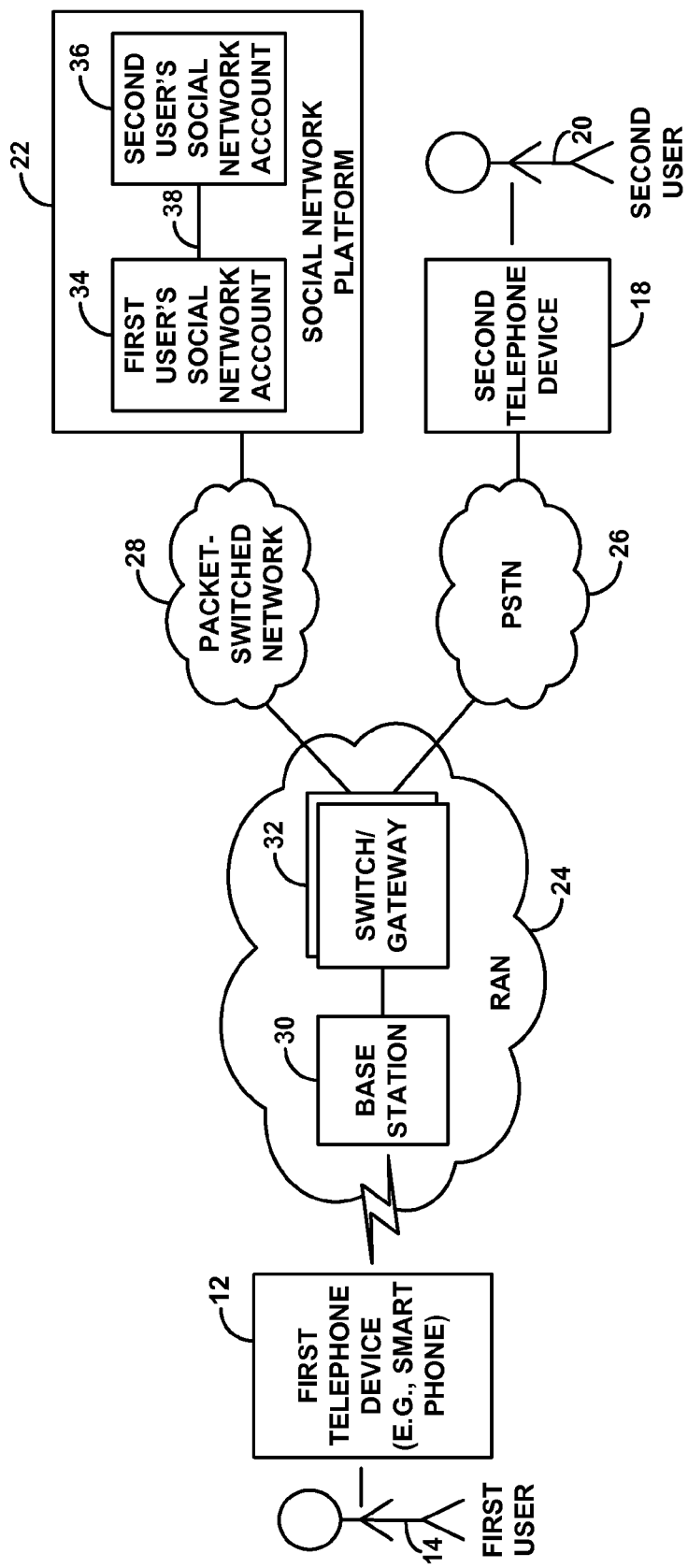
FIG. 2 is another simplified block diagram generally depicting a representative arrangement in which embodiments of the present method can be implemented.

FIG. 2 is next a more specific, but still simplified, block diagram of an arrangement in which embodiments of the present method can be implemented. In the arrangement of FIG. 2, the first telephone device 12 is shown as a wirelessly-equipped smart phone. The first telephone device 12 is then shown being served by a cellular radio access network (RAN) 24, which provides connectivity in turn with the public switched telephone network (PSTN) 26 and a packet-switched network 28 such as the Internet. Shown accessible via the PSTN 26 is then the second telephone device 18. And shown accessible via the packet-switched network 28 is the social network platform 22.

In practice, the RAN 24 may take any of a variety of forms, arranged to serve the first telephone device 12 according to any of a variety of air interface protocols, examples of which include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT or 1xEV-DO), and Global System for Mobile Communications (GSM). And the first telephone device 12 may be correspondingly configured to be served by the RAN according to the same air interface protocol.

As shown by way of example, the RAN 24 includes a representative base station (e.g., eNodeB) 30, which radiates to define a coverage area in which the first telephone device 12 may communicate with the base station. Further, the RAN 24 includes one or more switches and/or gateways 32 the provide connectivity with the PSTN 26 and the packet-switched network 28. With this arrangement, as a general matter, the first telephone device 12 may engage in a communication via the RAN 24 and PSTN 26 with the second telephone device 18, and the first telephone device 12 may engage in communication via the RAN 24 and the packet-switched network 28 with the social network platform 22.

Note that, in an alternative arrangement, the second telephone device 18 could be situated elsewhere, and the first telephone device 12 and second telephone device 18 may communicate with each other through other paths. By way of example, the second telephone device 18 could itself be served over an air interface by the RAN 24, in which case the first telephone device 12 might engage in a communication with the second telephone device 18 simply via the RAN 24, and perhaps via one or more associated servers. And as another example, the second telephone device 18 could sit on the packet-switched network 28 or otherwise be accessible via the packet-switched network 28, in which case the first telephone device 12 might engage in a communication with the second telephone device 18 via the RAN 24 and the packet-switched network 28. For instance, the first telephone device 12 and second telephone device may engage in a VoIP call with each other or in another type of packet-based communication with each other.

In the arrangement shown, the second telephone device 18 may also be a wirelessly-equipped smart phone or may take other forms. Further, the second telephone device 18 may have a unique telephone number usable to engage in communications, and the first telephone device 12 may have a personal address book that includes a contact entry correlating that telephone number with a name or other identifier of the second user 20.

Thus, in practice, the first user 14 may enter the telephone number of the second telephone device 18 into a telephone dialer of the first telephone device 12 or may select the telephone number or associated name/identifier from the contact entry or from a call log, to cause the first telephone device 12 to place a telephone call to the telephone number of the second telephone device 18. And in response, the first telephone device 12 may transmit a call origination signal over the air to the RAN 24, and the RAN 24 may work to set up the call between the first telephone device 12 and the second telephone device 18. Alternatively, the first telephone device 12 may receive from the RAN 24 a page message or other signaling message indicating an incoming telephone call to the first telephone device 12 from the telephone number of the second telephone device 18, and specifying the telephone number of the second telephone device 18. And in response, the first telephone device 12 may signal to the RAN 24, and the RAN 24 may connect the incoming call through to the first telephone device 12.

Alternatively, the first user 14 may enter the telephone number of the second telephone device 18 into a text messaging application of the first telephone device 12 or may select the telephone number or associated name/identifier from the contact entry or from a message log, to cause the first telephone device 12 to enter a message exchange mode for communicating with the second telephone device 18, and the first user 14 may type or otherwise enter an outbound text message and direct the first telephone device 12 to send the message to the indicated telephone number. In response, the first telephone device 12 may then display the text message and transmit the text message as an SMS message to the RAN 24, and the RAN 24, making use of a Short Message Service Center (SMSC), may forward the message to the second telephone device 18 having the designated telephone number. Further, the first telephone device 12 may receive from the RAN an incoming text message designating as a source address the telephone number of the second telephone device 18, and the first telephone device 12 may display that incoming text message for viewing by the first user 14.

FIG. 2 illustrates conceptually within the social network platform 22 a representative social network account 34 of the first user 14 and a representative social network account 36 of the second user 20, as well as a representative social network connection 38 between these social network accounts. In practice, the social network platform 22 may be operated by a social network service provider, and the social network service provider may, upon request, establish these social network accounts for the users. Each social network account may then have a respective username or other identifier usable to reference the social network account, such as to select the social network account from a list of connections in another social network account. Further, the representative social network connection 38 may be a logical connection between the social network accounts, established by agreement or otherwise between the first user 14 and second user 20 and stored by the social network platform 22 as data representing an account relationship.

Although not shown, the social network platform 22 may store in one or more database servers a variety of data associated with each respective social network account, including for instance newsfeed posts and images as discussed above, so that the social network platform 22 can readily access such data. Thus, a social network application interacting with the social network platform 22 and accessing a particular social network account may request and receive such data, including for instance images as discussed above.

Figure 3:
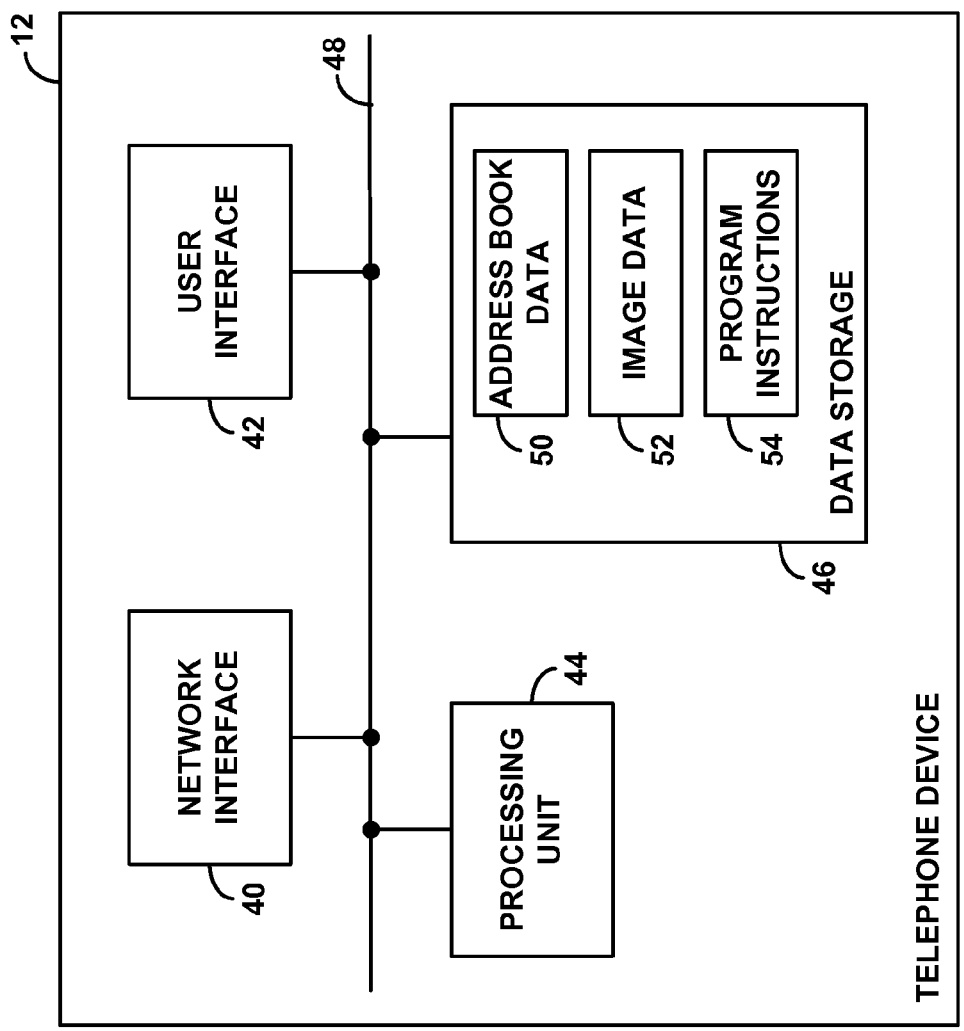
FIG. 3 is a simplified block diagram of an example telephone device operable in the arrangement of FIG. 2.

FIG. 3 is next a simplified block diagram showing components of an example first telephone device 12 operable in the arrangement of FIG. 2. In practice, as noted above, this example first telephone device 12 could be a smart phone. Alternatively, the example first telephone device 12 could take other forms, such as a tablet computer, wearable computing/communication device, or the like.

As shown in FIG. 3, the example first telephone device 12 includes a network interface 40, a user interface 42, a processing unit 44, and non-transitory data storage 46, all of which may be communicatively linked together by a system bus, network, or other connection mechanism 48. Although these components are shown as separate blocks in this figure, the components may be integrated together or distributed in various ways. For instance, the processing unit 44 may be integrated with the network interface 40, and the data storage 46 may be integrated with the processing unit 44.

The network interface 40 of the example first telephone device 12 may include a wireless communication interface, such as a chipset defining a transceiver compliant with an air interface protocol of the type discussed above and an antenna structure to facilitate air interface communication with the RAN 24. Alternatively, the network interface 40 may take other forms to enable the first telephone device 12 to engage in communications such as those discussed above.

The user interface 42 may function to facilitate interaction between the first user 14 and the first telephone device 12. As such, the user interface 42 may include input components such as a touch-sensitive panel or display screen, a keyboard or keypad, a microphone, and a camera, and output components such as a display screen, and a sound speaker and/or headset port. Further, the user interface may include analog-digital conversion circuitry, to facilitate conversion between analog interaction with the first user 14 (e.g., voice input and output) and processing and network communication (e.g., transmission and reception of corresponding voice data). And the user interface 42 may include a display driver, for providing graphics such as images for presentation on the display screen. Still further, the first telephone device 12 may support graphics output to an external user interface as well, as discussed above.

The processing unit 44 may comprise one or more general purposes processors (e.g., microprocessors) and/or one or more special purpose processors (e.g., application specific integrated circuits). And the data storage 46 may comprise one or more volatile and/or non-volatile storage components, such as magnetic, optical, or flash storage. As shown, the data storage 46 of the example first telephone device 12 may hold address book data 50, image data 52, and program instructions 54, among various other data.

As discussed above, the address book data 50 may include a directory for holding user-supplied contact entries that provide correlations between telephone numbers or other addresses and names or other identifiers. Thus, the first telephone device 12 may use this data as a basis to map a telephone number of the second telephone device 18 to a name or other identifier that the first telephone device 12 can then use as a basis to access a social network account of the second user 20.

The image data 52 may then include images (still and/or moving) of various types, which may be tagged with metadata identifying or describing people or objects in the images. These images may include images captured by a camera of the first telephone device 12 or otherwise loaded into the data storage 46 of the first telephone device 12, perhaps tagged with metadata specified by the first user 14. Further, from time to time, the image data 52 may include images retrieved by the first telephone device 12 from the social network account of the second user 20 with whom the first user 14 engages in a communication as discussed above. And the image data 52 may include collages or other derivations of these or other images for presentation to the first user 14 as discussed above.

The program instructions 54 may then include instructions executable by the processing unit 44 to cause the first telephone device 12 to carry out various functions as described herein. As such, by way of example, the program instructions 54 may include first program instructions such as a social network application or browser as described above, executable by the processing unit 44 to access via the network interface 40 an online social network service such as that provided by the social network platform 22. Further, the program instructions 54 may include second program instructions executable by the processing unit 44 to detect a communication via the network interface 40 between the first telephone device 12 and a remote device such as the second telephone device 18, and to responsively carry out various functions as described above. For instance, the functions may include (i) using the first program instructions to access an account that the first user 14 of the first telephone device 12 has with the online social network service, (ii) through the accessed account of the first user 14, accessing an account that a second user 20 the remote device has with the online social network service, (iii) obtaining at least one image from the accessed account that the second user 20 of the remote device has with the online social network service, and (iv) providing for presentation on the user interface 42 the at least one obtained image.

In line with the discussion above, the communication could be a telephone call, an SMS message exchange, or could take some other form. Further, the act of accessing the social network account of the second user 20 may involve mapping a telephone number of the remote device to an identifier of the social network account of the second user 20 and using the identifier of the social network account of the second user 20 to access the social network account of the second user 20. And the telephone number used in this mapping could be determined by the first telephone device 12 based on signaling received in connection with setup of the communication, such as in caller-identification signaling received by the first telephone device 12 or in connection with receipt of an SMS message by the first telephone device 12.

Further in line with the discussion above, the second program instructions may be executable by the processing unit 44 to present the at least one obtained image on the user interface 40 during the communication, such as during at least part of the communication. And in a scenario where the at least one obtained image includes multiple images, the act of providing the at least one obtained image for presentation on the user interface 42 may involve generating and providing a collage of at least the multiple images for presentation on the user interface 42 and/or generating and providing a slide show of at least the multiple images for presentation on the user interface 42. As such, the program instructions may further include or make use of a graphics processing program configured to receive multiple images and generate and provide as output a compilation such as a collage and/or slide show of the images.

Figure 5:
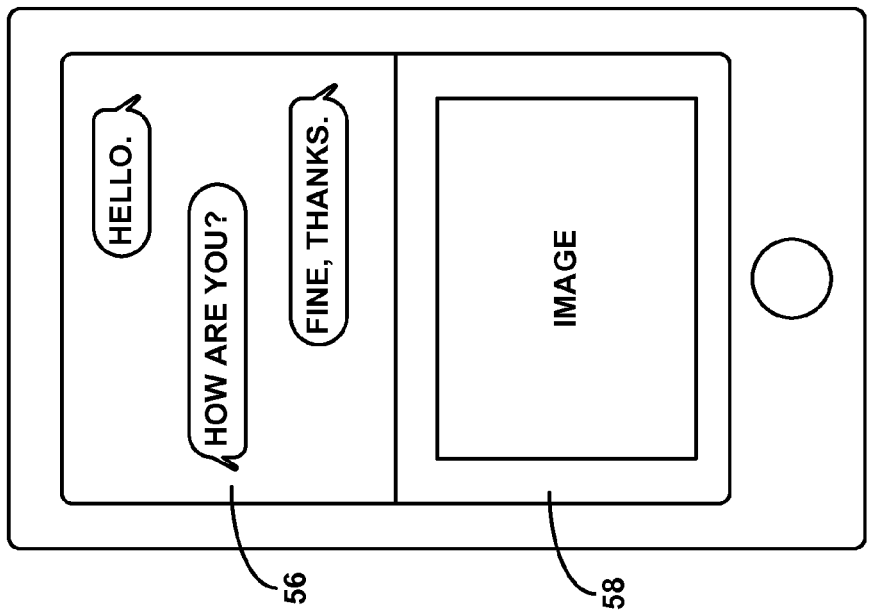
FIG. 5 is another example illustration of how images may be displayed by a telephone device in an example implementation.
Figure 4:
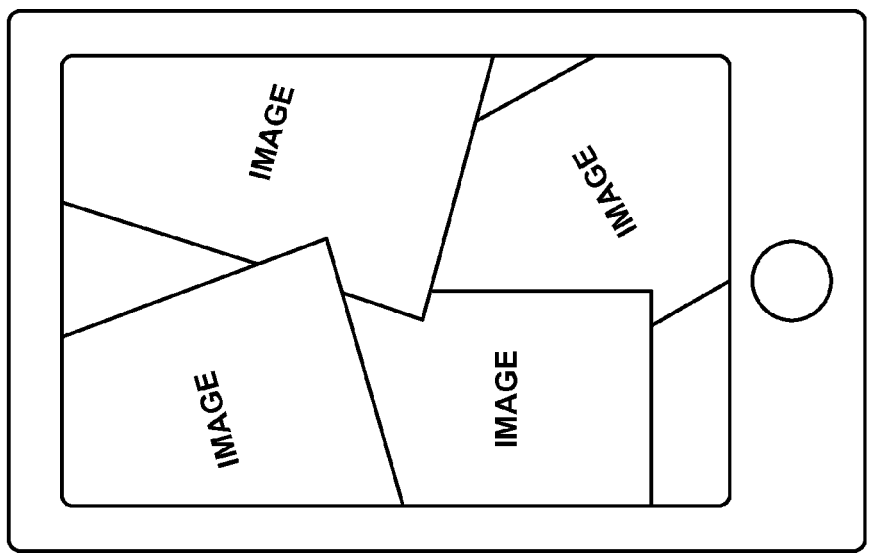
FIG. 4 is an example illustration of how images may be displayed by a telephone device in an example implementation.

FIGS. 4 and 5 are next example illustrations of how the first telephone device 12 could display multiple images that the first telephone device 12 obtained from a social network account of the second user 20 in line with the discussion above, perhaps together with one or more other images obtained from one or more other sources.

FIG. 4 shows one example where the first telephone device 12 presents the images in a collage format filling substantially an entire display screen of the first telephone device 12. The first telephone device 12 could in theory present such a collage as an integral image made up of the various underlying images, or could in theory present such a collage as individually selectable images, such that the first user 14 could perhaps click on any given image in the collage to cause the selected image to be expanded and presented fully on the display screen. Other arrangements are possible as well.

FIG. 5 next shows an example where the first telephone device 12 presents a slide show of the images in a split screen in conjunction with presentation by the first telephone device 12 of a text message exchange between the first user 14 and the second user 20. As shown in this figure, a top portion 56 of the display screen depicts a portion of the text message exchange, and a bottom portion 58 of the display screen depicts one image in what may be a sequence of images displayed in a slide show format. Further, as noted above, the first telephone device 12 may provide an on-screen keyboard interchangeable with the image presentation in the bottom portion 58, to enable the first user 14 to enter text message content. Other examples of presentations of images in line with the present method may be possible as well.

Figure 6:
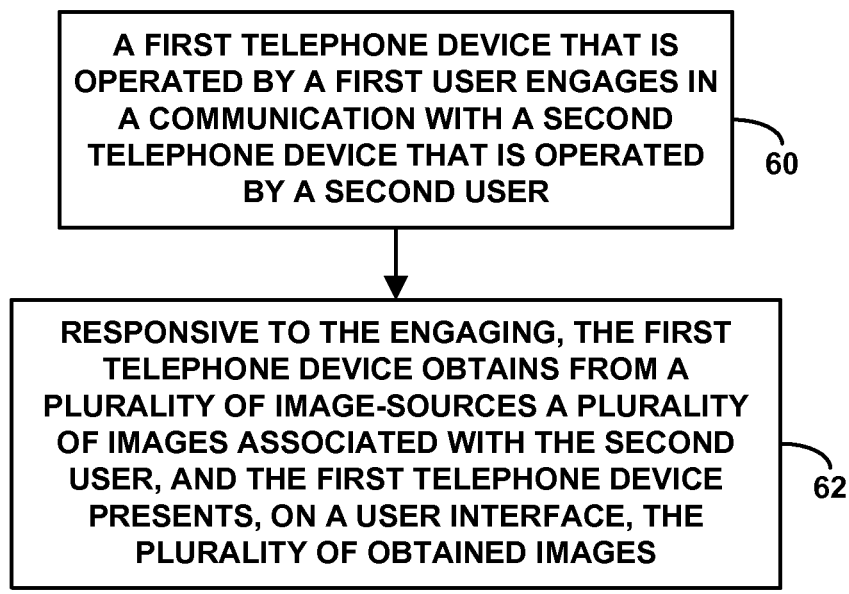
FIG. 6 is a flow chart depicting functions that can be implemented in accordance with an example implementation.

FIG. 6 is next a flow chart depicting various functions that can be carried out in accordance with present disclosure. As shown in FIG. 6, at block 60, the functions include a first telephone device that is operated by a first user engaging in a communication with a second telephone device that is operated by a second user. And at block 62, the functions include, responsive to the engaging, the first telephone device obtaining from a plurality of image-sources a plurality of images associated with the second user, and the first telephone device presenting, on a user interface, the plurality of obtained images.

In line with the discussion above, the act of the first telephone device obtaining from the plurality of image-sources the plurality of images associated with the second user may involve (a) the first telephone device obtaining, as one or more of the plurality of images, one or more images from a social network account of the second user and (b) the first telephone device obtaining, as another one or more of the plurality of images, one or more other images from an image library stored by the first telephone device.

Further, the act of the first telephone device obtaining the one or more images from the social network account of the second user may involve (i) the first telephone device accessing a social network account of the first user and (ii) the first telephone device using a social network connection between the accessed social network account of the first user and the social network account of the second user, to obtain through the accessed social network account of the first user the one or more images from the social network account of the second user. More particularly, the first telephone device may (a) map a telephone number of the second telephone device to an identifier of the social network account of the second user, (b) through the social network account of the first user, use the identifier of the social network account of the second user to access the social network account of the second user, such as by requesting such access from the social network platform, and (c) extract the one or more images image from an image library defined by the accessed social network account of the second user, such as by requesting and receiving from the social network platform one or more images most recently posted/shared on the accessed social network account of the second user.

Moreover, the act of the first telephone device obtaining the one or more other images from the image library stored on the first telephone device may involve (i) the first telephone device searching through the image library on the first telephone device to identify at least one image associated with the second user, such as by searching for one or images based on the one or more images being tagged with metadata that identifies or is otherwise associated with the second user and (ii) the first telephone device obtaining from the image library on the first telephone device the at least one identified image.

Further, also in line with the discussion above, the communication may comprise a telephone call placed to the second telephone device or received from the second telephone device. And in a scenario where the communication is a telephone call placed from the second telephone device to the first telephone device, the first telephone device may determine, from calling number identification received during setup of the telephone call, the telephone number of the second telephone device, and the first telephone device may map that telephone number to the identifier, such as by querying an address book in the first telephone device to obtain the identifier (e.g., name of the second user) based on the telephone number. Alternatively, the first telephone device may receive the identifier itself in the call setup signaling, as calling name identification for instance, and may thus forgo this mapping function.

In addition, in a scenario where the first telephone device is programmed with a software application that provides access to the social network account of the first user, such as a social network application as discussed above, the act of the first telephone device accessing the social network account of the first user may involve (i) calling the software application, and (ii) using the software application to access the social network account of the first user. Further, the act of using the social network connection between the accessed social network account of the first user and the social network account of the second user to obtain the at least one image may then involve (i) using the called software application to access, through the social network account of the first user, the social network account of the second user, and (ii) extracting from the accessed social network account of the second user the one or more images.

Moreover, also in line with the discussion above, the presentation of the at least one obtained image may occur at least in part (i.e., at least part of the presentation may occur) during the communication (i.e., during at least part of the communication). For instance, if the communication is a telephone call, the presentation may occur during at least part of the telephone call. And if the communication is an SMS message exchange comprising sending an SMS message to the second telephone device and/or receiving an SMS message from the second telephone device, the presentation may occur concurrently with the presentation of at least a portion of the SMS message exchange.

Further, the first telephone device may advantageously present the obtained plurality of images (including the one or more images obtained from the social network account of the second user, and the one or more images obtained from the local images library on the first telephone device) with the images stitched together, such as in a collage or a slide show, for convenient viewing by the first user.

Figure 7:
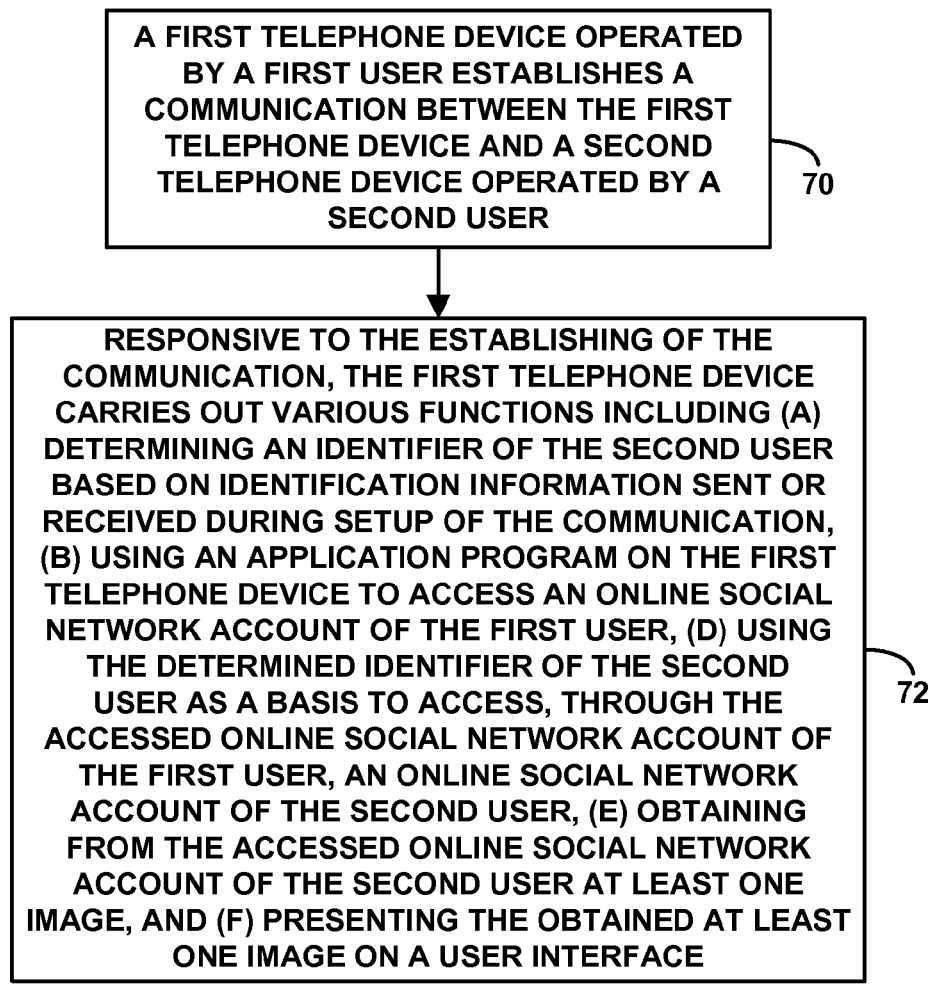
FIG. 7 is another flow chart depicting functions that can be implemented in accordance with an example implementation.

Finally, FIG. 7 is another flow chart depicting various functions that can be carried out in accordance with present disclosure. As shown in FIG. 7, at block 70, the functions include a first telephone device operated by a first user establishing a communication between the first telephone device and a second telephone device operated by a second user, such as placing/sending or receiving such a communication. And at block 72, the functions include, responsive to the establishing of the communication, the first telephone device carrying out various functions including (a) determining an identifier of the second user based on identification information sent or received during setup of the communication, (b) using an application program on the first telephone device to access an online social network account of the first user, (d) using the determined identifier of the second user as a basis to access, through the accessed online social network account of the first user, an online social network account of the second user, (e) obtaining from the accessed online social network account of the second user at least one image, and (f) presenting the obtained at least one image on a user interface. And again here, the act of presenting the obtained at least one image on the user interface may involve presenting the obtained at least one image in a collage or in a slide show at least in part during the communication.

Exemplary embodiments have been described above. Those of ordinary skill in the art will appreciate, however, that variations from the embodiments described are possible, and that numerous changes may therefore be made while remaining within the true scope and spirit of the invention.

I claim:

1. A method comprising:
    engaging, by a first telephone device operated by a first user, in a text message exchange with a second telephone device operated by a second user; and
    responsive to the engaging, obtaining by the first telephone device, from a plurality of image-sources, a plurality of images associated with the second user, and presenting by the first telephone device, on a user interface, the plurality of obtained images, wherein presenting the plurality of obtained images on the user interface comprises presenting on the user interface a split screen including a first portion showing the text message exchange and a separate second portion showing the plurality of obtained images, wherein obtaining by the first telephone device from the plurality of image-sources the plurality of images associated with the second user comprises (a) obtaining by the first telephone device, as one or more of the plurality of images, one or more images from a social network account of the second user and (b) obtaining by the first telephone device, as another one or more of the plurality of images, one or more other images from an image library stored by the first telephone device, wherein obtaining by the first telephone device the one or more images from the social network account of the second user comprises (i) accessing by the first telephone device a social network account of the first user, (ii) using, by the first telephone device, a social network connection between the accessed social network account of the first user and the social network account of the second user, to obtain through the accessed social network account of the first user the one or more images from the social network account of the second user, and wherein obtaining by the first telephone device the one or more other images from the image library stored on the first telephone device comprises (i) searching by the first telephone device through the image library to identify at least one image based on the at least one image being tagged with metadata associated with the second user and (ii) obtaining by the first telephone device from the image library the at least one identified image.

2. The method of claim 1, wherein presenting on the user interface the plurality of obtained images comprises presenting on the user interface the plurality of images stitched together.

3. The method of claim 2, wherein presenting on the user interface the plurality of images stitched together comprises an action selected from the group consisting of:
(i) generating a collage comprising the plurality of images and presenting the generated collage on the user interface, and
(ii) presenting on the user interface a slide show of the plurality of images.

4. The method of claim 1, wherein using the social network connection to obtain through the accessed social network account of the first user the at least one image from the social network account of the second user comprises:
mapping a telephone number of the second telephone device to an identifier of the social network account of the second user;
through the social network account of the first user, using the identifier of the social network account of the second user to access the social network account of the second user; and
extracting the at least one image from an image library defined by the accessed social network account of the second user.

5. The method of claim 4, wherein the identifier of the social network account of the second user comprises a name of the second user, and wherein mapping the telephone number of the second telephone device to the identifier of the social network account of the second user comprises:
querying an address book in the first telephone device to obtain the identifier based on the telephone number.

6. The method of claim 1, wherein the first telephone device is programmed with a software application that provides access to the social network account of the first user,
wherein accessing by the first telephone device the social network account of the first user comprises (i) calling the software application, and (ii) using the software application to access the social network account of the first user, and
wherein using the social network connection between the accessed social network account of the first user and the social network account of the second user to obtain the at least one image comprises (i) using the called software application to access, through the social network account of the first user, the social network account of the second user, and (ii) extracting from the accessed social network account of the second user the at least one image.

7. The method of claim 1, wherein the text message exchange comprises a Short Message Service (SMS) message exchange, and wherein engaging in the text message exchange with the second telephone device comprises an action selected from the group consisting of sending an SMS message to the second telephone device and receiving an SMS message from the second telephone device.

8. The method of claim 7, wherein presenting the plurality of images comprises presenting the plurality of images concurrently with presenting at least a portion of the SMS message exchange.

9. The method of claim 1, wherein the first telephone device is a cellular telephone, wherein the user interface comprises a display screen, and wherein each of the at least one image is selected from the group consisting of (i) a still image and (ii) a moving image.

10. A telephone device comprising:
a network interface;
a user interface;
a processing unit;
data storage;
first program instructions stored in the data storage and executable by the processing unit to access via the network interface an online social network service; and
second program instructions stored in the data storage and executable by the processing unit to detect a text message exchange via the network interface between the telephone device and a remote device, and to respond to the detecting of the text message exchange by carrying out functions comprising (i) using the first program instructions to access an account that a user of the telephone device has with the online social network service, (ii) through the accessed account of the user of the telephone device, accessing a social network account that a user of the remote device has with the online social network service, (iii) obtaining at least one image from the accessed social network account that the user of the remote device has with the online social network service, (iv) obtaining from an image library stored in the telephone device at least one image associated with the user of the remote device, and (v) providing for presentation on the user interface a plurality of images including both the at least one image obtained from accessed social network account of the user of the remote device and the at least one image obtained from the image library stored in the telephone device,
wherein providing the plurality of images for presentation on the user interface comprises providing for presentation on the user interface a split screen presentation including a first portion showing the text message exchange and a separate second portion showing the plurality of images.

11. The telephone device of claim 10, wherein the second program instructions are executable by the processing unit to present the at least one obtained image on the user interface during the text message exchange.

12. The telephone device of claim 10, wherein the text message exchange comprises a Short Message Service (SMS) message exchange.

13. The telephone device of claim 10, wherein accessing the account that the user of the remote device has with the online social network service comprises:
   mapping a telephone number of the remote device to an identifier of the social network account that the user of the remote device has with the social network service; and
   using the identifier to access the social network account of the second user.

14. The telephone device of claim 10, wherein providing for presentation on the user interface the plurality of images comprises an action selected from the group consisting of:
   (i) generating a collage comprising the plurality of images and providing the generated collage for presentation on the user interface, and
   (ii) providing for presentation on the user interface a slide show of the plurality of images.

15. A method comprising:
   establishing, by a first telephone device operated by a first user, a text message communication between the first telephone device and a second telephone device operated by a second user; and
   responsive to the establishing of the text message communication, carrying out by the first telephone device a plurality of functions comprising (a) determining an identifier of the second user based on identification information sent or received during setup of the text message communication, (b) using an application program on the first telephone device to access an online social network account of the first user, (d) using the determined identifier of the second user as a basis to access, through the accessed online social network account of the first user, an online social network account of the second user, (e) obtaining from the accessed online social network account of the second user at least one image, and (f) presenting the obtained at least one image on a user interface,
   wherein presenting the obtained at least one image on the user interface comprises presenting on the user interface a split screen including a first portion showing the text message exchange and a second portion showing the obtained at least one image in a collage or in a slide show, and wherein the presenting occurs at least in part during the text message communication.

16. The method of claim 15, further comprising, responsive to establishing of the communication, obtaining from an image library stored at the first telephone device at least one additional image associated with the second user,
   wherein presenting the obtained at least one image on the user interface comprises presenting the obtained at least one image in conjunction with presentation of the at least one additional image associated with the second user.

* * * * *